US012755889B2

(12) United States Patent
Lestician

(10) Patent No.: US 12,755,889 B2
(45) Date of Patent: *Oct. 6, 2026

(54) METHOD FOR REDUCING ELECTRICAL CONSUMPTION USING MAGNETIC TRANSFORMER DEVICES

(71) Applicant: Harmonify AB, Marviken (SE)

(72) Inventor: Guy J. Lestician, East Stroudsburg, PA (US)

(73) Assignee: Harmonify AB, Marviken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/251,363

(22) Filed: Jun. 26, 2025

(65) Prior Publication Data

US 2026/0302043 A1 Oct. 1, 2026

Related U.S. Application Data

(63) Continuation-in-part of application No. 19/094,157, filed on Mar. 28, 2025, now abandoned.

(51) Int. Cl.
*H01F 27/28* (2006.01)
*H01F 27/24* (2006.01)

(52) U.S. Cl.
CPC ......... *H01F 27/2823* (2013.01); *H01F 27/24* (2013.01)

(58) Field of Classification Search
CPC ..... H04R 9/046; H01F 27/2823; H01F 27/24; H01F 17/062; H03H 7/42; Y10T 29/4902; Y10T 29/49071; Y10T 29/49073
See application file for complete search history.

(56) References Cited

U.S. PATENT DOCUMENTS 4,163,218 A 7/1979 Wu
4,845,580 A 7/1989 Kitchens
(Continued)

FOREIGN PATENT DOCUMENTS

CN 201332357 Y 10/2009
CN 110086452 A 8/2019
(Continued)

OTHER PUBLICATIONS

International Search Report for International Application No. PCT/US2026/016718 dated Apr. 30, 2026, 3 pages.
(Continued)

*Primary Examiner* — Donghai D Nguyen
(74) *Attorney, Agent, or Firm* — Wilkinson Law Office; Clinton H. Wilkinson

(57) ABSTRACT

A method and device for reducing electrical consumption in an electric circuit includes the following components:
a) An electromagnetic induction Voigt filter, dry type;
b) A harmonics Snubber/Cyber network filter;
c) Linear phase FIR notch filters;
d) Surge suppression device;
e) A surge suppression device with EMP Faraday filters;
f) Active atomic resonance filter;
g) Harmonic surge filter;
h) A high efficiency magnetic transformer with at least a first coil core having a central orifice, and having three distinct wire windings for creating a transformer,
wherein at least one of the first wire, the second wire and the third wire have different conductive chemical contents from the others of the first wire, the second wire and the third wire.

15 Claims, 11 Drawing Sheets

(56) References Cited

U.S. PATENT DOCUMENTS

| | | | | |
|---|---|---|---|---|
| 4,870,528 | A | 9/1989 | Harford | |
| 5,105,327 | A | 4/1992 | Wohlforth | |
| 5,200,718 | A * | 4/1993 | Kato | H03H 7/42 333/32 |
| 5,420,741 | A | 5/1995 | Ushiyama et al. | |
| 5,432,710 | A | 7/1995 | Ishimaru et al. | |
| 5,436,513 | A | 7/1995 | Kaye et al. | |
| 5,459,459 | A | 10/1995 | Lee, Jr. | |
| 5,462,225 | A | 10/1995 | Massara et al. | |
| 5,483,672 | A | 1/1996 | Sasuta | |
| 5,495,129 | A | 2/1996 | Schou et al. | |
| 5,512,831 | A | 4/1996 | Cisar et al. | |
| 5,517,188 | A | 5/1996 | Carroll et al. | |
| 5,528,123 | A | 6/1996 | Hutchison | |
| 5,640,314 | A | 6/1997 | Glasband et al. | |
| 5,646,458 | A | 7/1997 | Bowyer et al. | |
| 5,754,323 | A | 5/1998 | Rivers et al. | |
| 5,880,677 | A | 3/1999 | Lestician | |
| 5,892,667 | A | 4/1999 | Glasband et al. | |
| 6,009,004 | A | 12/1999 | Swamy | |
| 6,014,017 | A | 1/2000 | Weinhold et al. | |
| 6,058,035 | A | 5/2000 | Madenokouji et al. | |
| 6,384,583 | B1 | 5/2002 | Lestician | |
| 6,448,747 | B1 | 9/2002 | Lestician | |
| 7,573,253 | B2 | 8/2009 | Lestician | |
| 8,538,060 | B2 * | 9/2013 | Liu | H04R 9/046 381/409 |
| 9,859,049 | B2 * | 1/2018 | Lestician | H01F 17/062 |
| 12,009,656 | B1 | 6/2024 | Doynov | |
| 2011/0199175 | A1 | 8/2011 | Mino | |
| 2015/0256090 | A1 | 9/2015 | Lestician | |
| 2015/0270057 | A1 | 9/2015 | Lestician | |
| 2016/0322903 | A1 | 11/2016 | Lestician | |
| 2019/0131064 | A1 | 5/2019 | Lestician | |
| 2019/0139698 | A1 | 5/2019 | Lestician | |
| 2019/0140611 | A1 | 5/2019 | Lestician | |
| 2019/0148965 | A1 | 5/2019 | Shin | |
| 2020/0243250 | A1 | 7/2020 | Igarashi | |
| 2021/0012949 | A1 | 1/2021 | Miyamoto | |
| 2023/0231492 | A1 | 7/2023 | Harrison | |

FOREIGN PATENT DOCUMENTS

| | | | |
|---|---|---|---|
| CN | 111463667 | A | 7/2020 |
| CN | 112652466 | A | 4/2021 |

OTHER PUBLICATIONS

International Search Report for International Application No. PCT/US2026/016721 dated Apr. 10, 2026, 2 pages.

International Search Report for International Application No. PCT/US2026/016723 dated Apr. 30, 2026, 2 pages.

* cited by examiner

METHOD FOR REDUCING ELECTRICAL CONSUMPTION USING MAGNETIC TRANSFORMER DEVICES

REFERENCE TO RELATED APPLICATIONS

The present application is a continuation-in-part of co-pending United States patent application titled "Quantum Magnetic Transformer and Related Energy Saving Devices and Methods" filed on Mar. 28, 2025, by the same inventor herein, being application Ser. No. 19/094,157.

BACKGROUND OF INVENTION a. Field of Invention

The present invention relates to electrical power supply deficiencies and correction of such deficiencies. Thus, as an overview, the present invention is directed to high efficiency magnetic transformers and related methods/devices that create systems for conserving electrical energy consumption in commercial, industrial, residential, or other energy consumption that draws power from a distribution system. Prior art systems utilize various filters, transformers and other components to raise power factor, to filter out and reduce harmonics, and to make adjustments for and correct effects of surges and drops. The below cited prior art discloses improvements on such devices. The present invention is now directed to an improvement over iterative transformers and other devices. More specifically, the present invention is directed to high efficiency magnetic transformers, and devices that include one or more of these high efficiency magnetic transformers in combination with various applications—gird, off grid, AC power, DC power, homes, offices, factories, institutions, and any structure, fixed or portable, that uses electric power. The present invention high efficiency magnetic transformers (also referred to as reactors) are more advanced and efficient and more accurate than the above cited prior art iterative transformers and the devices that preceded the iterative transformer energy savers. The present invention includes one phase, two phase and three phase capabilities that are further described below. They are not limited to, but are particularly useful in, systems that conserve electrical energy consumption with control devices downstream from incoming power breakers or at power inlets for energy consuming structures, devices, equipment and appliances to increase efficiency relating to loads, distortions, spikes and/or power factors, as well as other deviant characteristics. In addition, these present invention reactors improve response time and result in more energy savings than the prior art electric power supply energy saving systems, including those previously developed by the present inventor. In summary, the present invention reactors and energy saving devices that improve many power quality conditions, including harmonic reduction, surge suppression, sag mitigation, swell mitigation, in-rush current limitations, phase balancing, phase synthesis and power factor correction.

b. Description of Related Art

The following patents are representative of systems and devices for conservation of electric consumption:

U.S. Pat. No. 4,163,218 relates to an electronic control system for controlling the operation of a plurality of electrical devices which are energized from AC power lines which includes a single, central unit connected to the power lines, which further includes a central transceiver means for transmitting an encoded oscillating signal of one frequency onto the power lines, a central encoding means for encoding means for encoding the oscillating signal with an encoded signal in synchronization with the frequency of the AC power for selective control of electrical devices, and a central control means connected to the encoding means for selecting the electrical device to be controlled and its desired state. The invention further includes unitary switch units respectively interconnected between power lines and each electrical device being operative for both local and centralized control of the electrical device with the local control and the centralized control placing the electrical device in respective opposite states from each other, each switch unit including a switch transceiver means for receiving the encoded oscillating signal from the power lines, a switch decoding means coupled to the switch transceiver means for detecting the encoded signal, a switch control means connected to the switch decoding means for setting the selected electrical device to the desired state, and a local control means for selectively locally operating the electrical device independently of the central unit and placing the electrical device in a state opposite from that which it was placed by the central unit.

U.S. Pat. No. 4,845,580 describes a spike elimination circuit for A.C. and D.C. power sources which comprises two gas tubes and/or two semiconductor voltage limiting devices before a Bandpass Filter. The Bandpass Filter consists of 2 capacitors to ground and inductor in series with the line. The spike eliminator can be portable, mobile, or hard wired for the protection of home controls and electronics, telecommunications, commercial and industrial controls and the computer field and others.

U.S. Pat. No. 4,870,528 describes a surge suppressor which comprises a first series circuit having a first inductance and a first alternating voltage limiter, including at least a first capacitance and a bidirectionally conductive rectifying circuit for charging the first capacitance, coupled between first and second input terminals for limiting surge currents and voltage excursions coupled to first and second load output terminals. The first alternation voltage limiter further comprises a sensing circuit for sensing at least one of the charging current supplied to the voltage developed across the first capacitance. An auxiliary energy storage circuit and a normally open switching device responsive to the sensing circuit are provided for coupling the auxiliary energy storage circuit across the first capacitance during high energy surge conditions.

U.S. Pat. No. 5,105,327 describes a power conditioner for AC power lines which has a choke and capacitor coupled in series across the power lines. The choke comprises a coil termination in a line, with the line looped back through the coil. The power lines are thereby balanced to provide greater operating efficiency. Capacitors and transient suppressors (e.g. varistors) are used for transient suppression and power factor correction.

U.S. Pat. No. 5,420,741 relates to an arrangement for obtaining flux rate information in a magnetic circuit including passive means connected across a flux rate sensor for implementing control of said flux rate. The passive means being a tuned magnetic flux rate feedback sensing and control arrangement wherein impedance is tuned and the energy loss characteristic is adjustable. The selection of inductance and capacitance values provides tuning and the selection of resistance affects the energy loss characteristics.

U.S. Pat. No. 5,432,710 is directed to an energy supply system for supplying, in system interconnection, power at a power receiving equipment from a power plant and power generated by a fuel cell to a power consuming installation, and supplying heat generated by the fuel cell to a heat consuming installation. This system includes an operation amount computing device for computing an amount of operation of the fuel cell to minimize an equation y-aXL+bXM+cXN, in response to an energy demand of the power consuming installation and heat consuming installation A control device controls the fuel cell to satisfy the amount of the operation computed. The system supplies energy in optimal conditions with respect to the cost borne by an energy consumer, consumption of primary energy and release of environmental pollutants. Energy is effectively used from the standpoint of the energy consumer and a national point of view.

U.S. Pat. No. 5,436,513 relates to an information handling system which is described as having a power supply and having a switching circuit that switches a plurality of energy sources between series and parallel couplings. Associated with the switching circuit is a voltage level detecting circuit for monitoring the voltage level of the energy sources. A processor for controlling the information handling system responds to the voltage level detecting circuit and in the event of a low voltage condition the processor activates the switching circuit to switch the energy sources and from a series to a parallel coupling. Alternatively, the processor responds to other inputs or conditions for actuating the switching circuit.

U.S. Pat. No. 5,459,459 is directed to an algorithm for implementation in a meter register and a reading device. In the one embodiment, the invention enables selecting a display table to be read from the register, updating the billing read date and time in the register, reversing the order in which load profile data is transmitted from the register to the reader, specifying the number of load profile intervals to be read from the register and specifying the number of intervals to skip when reading from the register.

U.S. Pat. No. 5,462,225 relates to an apparatus and method for controlling energy supplied to a space conditioning load and for overriding a load control operation in response to measuring certain space temperatures within a closed environment. The load control apparatus includes a control device connected to an electrical distribution network and to a space/conditioning load and a temperature sensing device connected to the control device. The control device conducts a load shedding operation to control distribution of electrical energy to the space conditioning load in response to command signals supplied by a remote command center. The temperature sensing device operates to override the load shedding operation by outputting a control overriding signal to the control device tin response to sensing certain space temperatures within the closed environment. If the temperature control device is connected to an air conditioning system the temperature sensing device causes the control device to terminate the load shedding operation prior to expiration of a selected time period in response to measuring a space temperature that exceeds a maximum space temperature limit. In contrast, if the temperature control device is connected to a forced air beating system, the temperature sensing device causes the control device to terminate the load shedding operation when a measured space temperature drops below a minimum space temperature limit the maximum space temperature limit is greater than the control temperature setpoint of a thermostat that controls the space conditioning operations, whereas the minimum space temperature limit is less than the control temperature setpoint.

U.S. Pat. No. 5,483,672 relates to a communication system, where a communication unit may conserve source energy when it is inactive in the following manner. The control channel is partitioned into a predetermined number of windows and a system window which are transmitted on the control channel in a round robin manner. When the communication unit registers with the communication system, it is assigned to a window group. The communication unit then monitors only the system window to determine whether the window group that its been assigned to is also assigned to one of the predetermined number of windows. When the window that has been assigned to the window group is being transmitted to the control channel the communication unit activates to monitor that window. Once the window is no longer being transmitted, the communication unit deactivates unit the system window is being transmitted or the window assigned to the window group is being transmitted.

U.S. Pat. No. 5,495,129 relates to an electronic device for multiplexing several loads to the terminals of a source of alternating electrical energy. The source of alternating electrical energy is coupled by electromagnetic flux to the loads by using primary excitation windings and connects to the terminals of the source of alternating electrical energy and secondary windings respectively corresponding to the number of loads. The secondary windings are at least partially coupled to the primary winding and are each connected to the terminals of a load. The coupling is inhibited by auxiliary winding which are each totally coupled with the secondary winding. The inhibition function is controlled in order to inhibit all the magnetic couplings except for one and this particular one changes as a function of the respective loads to be coupled to the source of alternating electrical energy.

U.S. Pat. No. 5,512,831 relates to a system for testing electrochemical energy conversion and storage devices includes means for sensing the current from the storage device and varying the load across the storage device in response to the current sensed. The system is equally adaptable to batteries and fuel cells. Means is also provided to sense system. Certain parameters are then stored in digital form for archive purposes and certain other parameters are used to develop control signals in a host processor.

U.S. Pat. No. 5,517,188 is directed to a programmable identification apparatus, and associated method, includes a transceiver and a transponder. The transponder is powered by the energy of a transceiver transmit signal generated by the transceiver and includes a programmable memory element. A coded sequence which uniquely identifies the transponder is stored in the programmable memory element and, when transponder is powered, the transponder generates a transponder signal which includes the coded sequence stored in the programmable memory element, once modulated by circuitry of the transponder.

U.S. Pat. No. 5,528,123 measures the total line current in a power cord which is used to energize both a power factor corrected system and a non-power factor corrected AC loads. The power factor control loop of the power factor corrected system is then driven to correct the power factor of total line current in the power cord ideally to approach unity.

U.S. Pat. No. 5,640,314 relates to a symmetrical ac power system which provides a balanced ac output, whose maximum voltage with respect to a reference ground potential is one-half the ac output voltage, and which is derived from a single phase ac source through the use of an isolation transformer having a center-tapped secondary winding. The center tap is connected to the output power load circuit as a ground reference potential with respect to the symmetrical ac output so as to constitute the reference ground potential for the power supply and load. Since symmetrical ac power is applied to the load by the system, reactive load currents, other power artifacts, EMI and RFI emissions and other interference and noise components ordinarily resulting from the application of conventional ac power to the load are reduced or eliminated by appearing as equal inversely phased signal elements which cancel one another. In order to maximize the performance of the symmetrical power system, the isolation transformer has a bifilar-wound secondary winding.

U.S. Pat. No. 5,646,458 describes a UPS (uninterruptible power system) which includes an UPS power conditioning unit that provides conditioned AC power to a critical load. The UPS power conditioning unit includes a variable speed drive that operates in response to AC utility power or to a standby DC input by providing a motor drive signal. The UPS power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the UPS power conditioning unit and the standby DC power source are initially operated in response to the utility AC power, the flywheel motor-generator storing kinetic energy in a rotating flywheel. When an outage occurs, the rotating flywheel continues to operate the flywheel motor-generator of the standby DC power source, causing the production of AC power which is rectified and provided as standby DC power to operate the variable speed drive of the UPS power conditioning unit either the utility AC power outage is over or a standby emergency generator is brought on line.

U.S. Pat. No. 5,880,677 relates to a system that monitors and controls electrical power consumption that will be retrofitted to a typical consumer electrical power arrangement (typical arrangement-electrical feed line from a provider, a meter, a circuit breaker and individual input wiring to a plurality of electrical devices, appliances and outlets). The system includes a control unit which receives information from an electromagnetic pickup device from which real time electrical consumption is determined over very short periods of time. The control unit has a main data processing and storage processor for retaining information and it may include a communication microprocessor for sending signals to corresponding modules. The electromagnetic pickup device uniquely measures the electromagnetic flux emanating at each output wire from each of the individual circuit breakers in a breaker box. The modules have filters which release electrical power to the individual electrical devices, appliances and outlets at a controlled, economic rate.

U.S. Pat. No. 5,892,667 describes a symmetrical as power system which provides a balanced ac output, whose maximum voltage with respect to a reference ground potential is one-half the ac output voltage, and which is derived from a single phase ac source through the use of an isolation transformer having a center-tapped secondary winding. The center tapped is connected to the output power load circuit as a ground reference potential with respect to the symmetrical ac output so as to constitute the reference ground potential for the power supply and load. Since symmetrical ac power is applied to the load by the system, reactive load currents, other power artifacts, EMI and RFI emissions and other interference ad noise components ordinarily resulting from the application of conventional ac power to the load are reduced or eliminated by appearing as equal inversely phased signal elements which cancel one another. In order to maximize the performance of the symmetrical power system, the isolation transformer has a bifilar-wound secondary winding.

U.S. Pat. No. 6,009,004 discloses a new single-phase passive harmonic filter for one or more nonlinear loads. The filter improves the total system performance by drastically reducing the line side current harmonics generated by nonlinear loads. The filter includes two inductive portions across one of which is connected a tuning capacitor. The parallel combination of one inductive portion which the tuning capacitor forms a series tuned filter configuration while the second inductive portion is used for harmonic attenuation. A shunt capacitor is employed for shunting higher order harmonic components. A single-phase passive voltage regulator provides the needed voltage bucking to prevent over voltage at the load terminals of the filter. The filter provides an alternate path for the harmonic current generated by nonlinear loads. The over voltage caused by the increased capacitive reactance is controlled by either capacitor switching or by the use of the passive voltage regulator or a combination of the two. Capacitor switching is dependent upon load conditions.

U.S. Pat. No. 6,014,017 describes a method and an apparatus for power factor correction for a non-ideal load, which is supplied for a main power supply, by a compensation device which is electrically connected in parallel with the load and has a pulse converter with at least one capacitive store. A transfer function space vector is calculated as a function of a determined mains power supply voltage space vector, a mains power supply current space vector, a compensator current space vector and of an intermediate circuit voltage which is present on the capacitive store. As a result of which the pulse converter generates a compensator voltage space vector on the main power supply side as a function of the intermediate circuit voltage. A compensator current space vector, that keeps the undesirable reactive current elements away from the mains power supply, is thus obtained via a coupling filter that is represented as a compensator inductance.

U.S. Pat. No. 6,058,035 describes a method wherein after starting the input of a switching signal to a booster circuit whose boosting rate is changeable in accordance with the duty ratio of the inputted switching signal and calculating the output power of an inventor circuit, which is connected to the subsequent stage of the booster circuit, from the output current of the inverter circuit, the target voltage after boosting by the booster circuit is obtained based on the output power. If the actual output voltage of the booster circuit is lower than the target voltage, the duty ratio of the above switching signal is increased, and if higher, the duty ratio of the above switching signal is decreased.

U.S. Pat. No. 6,384,583 B1 is a system including, in-parallel connection to an incoming power supply of a facility including a hot line and a neutral line, and at least one ground. There are components connected between the hot line and the neutral line in the order of: front metal oxide varistors; line transient voltage surge suppressor having to suppress undesired power spikes; at least one capacitor of predetermined capacitance; at least two dual chokes in the form of inductor/metal oxide varistor transformers; at least a second capacitor of its own predetermined capacitance; metal oxide varistors having a predetermined capability. In preferred embodiments, the metal oxide varistor may be a plurality of varistors in parallel; a failure indicator circuit connected to the transient voltage surge suppressor, including at least one relay, one voltage-surge responsive switch and one indicator signaling component.

U.S. Pat. No. 6,448,747 B1 is an electricity pod controller device that includes in-parallel connection to an incoming power supply of a facility including a hot line and a neutral line, and at least one round. There are components connected between the hot line and the neutral line. At least one front metal oxide varistor line transient voltage surge suppressor has a predetermined capability to suppress undesired power spikes and at least one capacitor of predetermined capacitance are also included. At least two dual chokes in the form of inductor/metal oxide varistor transformers, a second capacitor of its own predetermined capacitance and at least one metal oxide varistor having a predetermined capability. In preferred embodiments, the metal oxide varistor may be a plurality of varistors in parallel.

U.S. Pat. No. 7,573,253 B2 to Lestician describes a system for managing electrical consumption that includes a connecting means for connection to an incoming power supply of a facility, for connection in parallel, including a hot line and a neutral line, and at least one ground. The following components are connected between the hot line and the neutral line. They are connected in the order of at least one front capacitor of predetermined capacitance, at least one front arc suppressor, at least one front metal oxide varistor line transient voltage surge suppressor having a predetermined number of joules capability to suppress undesired power spikes, at least two inductor/metal oxide varistor iterative transformers, at least a second capacitor of its own predetermined capacitance, at least one metal oxide varistor having a predetermined number of joules capability and at least two capacitors, each having its own predetermined capacitance different form one another.

Notwithstanding the prior art, the present invention is neither taught nor rendered obvious thereby.

SUMMARY OF THE INVENTION

The present invention reactors and energy saving devices and methods improve many power quality conditions, including harmonic reduction, surge suppression, sag mitigation, swell mitigation, in-rush current limitations, phase balancing, phase synthesis and power factor correction.

In some embodiments, the present invention is a high efficiency magnetic transformer for energy saving devices, which includes a three windings transformer having at least three different wrapped incoming-outgoing wires, which includes: I) at least a first coil core having a central orifice, the first coil core being selected from the group consisting of a non-magnetic core and a magnetic core; II) a first wire having an incoming end and an outgoing end and being wrapped in a first plurality of winding's around at least 45% and preferably at least 50% of the core through the central orifice; III) a second wire having an incoming end and an outgoing end and being wrapped in a second plurality of winding's around at least 10% of the core through the central orifice in an area separate from the first plurality of winding's, wherein one end of the second wire is positioned under and through the first plurality of winding's; and IV) a third wire having an incoming end and an outgoing end and being wrapped in a third plurality of winding's around at least 10% of the core through the central orifice, the winding's being wound in a manner selected from the group consisting of (i) around the core only; (ii) around the core and around a portion of at least one of the first wire and the second wire; (iii) around the core and around a portion of both of the first wire and the second wire, wherein at least one of the first wire, the second wire and the third wire have different conductive chemical contents from at least one of the others of the first wire, the second wire and the third wire.

In some embodiments, the present invention is a high efficiency magnetic transformer wherein the different conductive chemical contents is a difference in percentage of conductive constituents. In other embodiments, the different conductive chemical contents is a difference in conductive metal elements. For example, at least one of the first wire, the second wire and the third wire includes copper and at least one other of the first wire, the second wire and the third wire does not contain copper. Thus, one two of the first wire, the second wire and the third wire may contain copper. As another example, at least one of the first wire, the second wire and the third wire includes silver and at least one other of the first wire, the second wire and third wire does not contain silver. Thus, two of the first wire, the second wire and the third wire may contain silver. As yet another example, at least one of the first wire, the second wire and the third wire includes aluminum and at least one other of the first wire, the second wire and the third wire does not contain aluminum. Thus, one or two of the first wire, the second wire and the third wire contain aluminum. Mixtures of these or other conductive metals may also be employed without exceeding the scope of the present invention.

In some embodiments, at least one of the first wire, the second wire and the third wire has different gauge thickness than at least one other of the first wire, the second wire and third wire. wherein a portion of the second wire is positioned at a right angle to and under the first wire.

In some embodiments, a portion of the second wire is positioned at right angle to and under the third wire. In other embodiments, a portion of the second wire is positioned at a right angle and under both of the first wire and the third wire.

In some embodiments, the third wire is wound around the core and around a portion of the first wire. In some preferred embodiments, the third wire is wound around the core and a portion of the first wire in a symmetric pattern.

The present invention is also directed to a method for reducing electrical consumption that includes installing a device in an electric circuit so as to activate the device, wherein the device includes the following components: a) An electromagnetic induction Voigt filter, dry type; b) A harmonics Snubber/Cyber network filter; c) Linear phase FIR notch filters; d) Surge suppression device; e) A surge suppression device with EMP Faraday filters; f) Active atomic resonance filter; g) Harmonic surge filter; and h) A present invention high efficiency magnetic transformer as described above.

In some present invention methods, the method includes a plurality of the high efficiency magnetic transformers. In some preferred methods of the present invention, the plurality of transformers are separated by a graphene divider. In some of these preferred embodiments, the surge suppression device with EMP Faraday filters is a ground system less than 5 Ohms with a high protection rating and a copper metal shield enclosure, wherein the graphene divider forms a magnetic plate and is connected to the copper shielding and the ground system. In some other preferred embodiments, the harmonic snubber/cyber network filter is set to suppress or clamp preselected wave frequencies of voltage transients. In other embodiments, the harmonic snubber/Cyber network filter is a voltage having transients within the voltage to suppress or clamp any preset frequencies tuned for an AC wave.

The present invention also includes the devices described in conjunction with the present invention methods. These devices may have one or more sets of sub-devices, each including:

a) An electromagnetic induction Voigt filter, dry type;
b) A harmonics Snubber/Cyber network filter;
c) Linear phase FIR notch filters;
d) Surge suppression device;
e) A surge suppression device with EMP Faraday filters;
f) Active atomic resonance filter;
g) Harmonic surge filter;
h) A present invention high efficiency magnetic transformer.
i) which comprises:

In some of the present invention devices wherein the plurality of high efficiency magnetic transformers is selected from the group consisting of two high efficiency magnetic transformers and three high efficiency magnetic transformers the plurality of transformers are separated by a graphene divider.

In some of these embodiments, the surge suppression device with EMP Faraday filters is a ground system less than 5 Ohms with a high protection rating and a copper metal shield enclosure, wherein the graphene divider forms a magnetic plate and is connected to the copper shielding and the ground system. In other embodiments, the harmonic snubber/cyber network filter is set to suppress or clamp preselected wave frequencies of voltage transients. In some embodiments, the harmonic scrubber/cyber network filter has a voltage having transients within the voltage to suppress or clamp any preset frequencies tuned for an AC wave.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The present invention will be more fully understood when the present specification is taken in conjunction with the appended drawings, wherein.

DETAILED DESCRIPTION OF THE INVENTION

Figure 1:
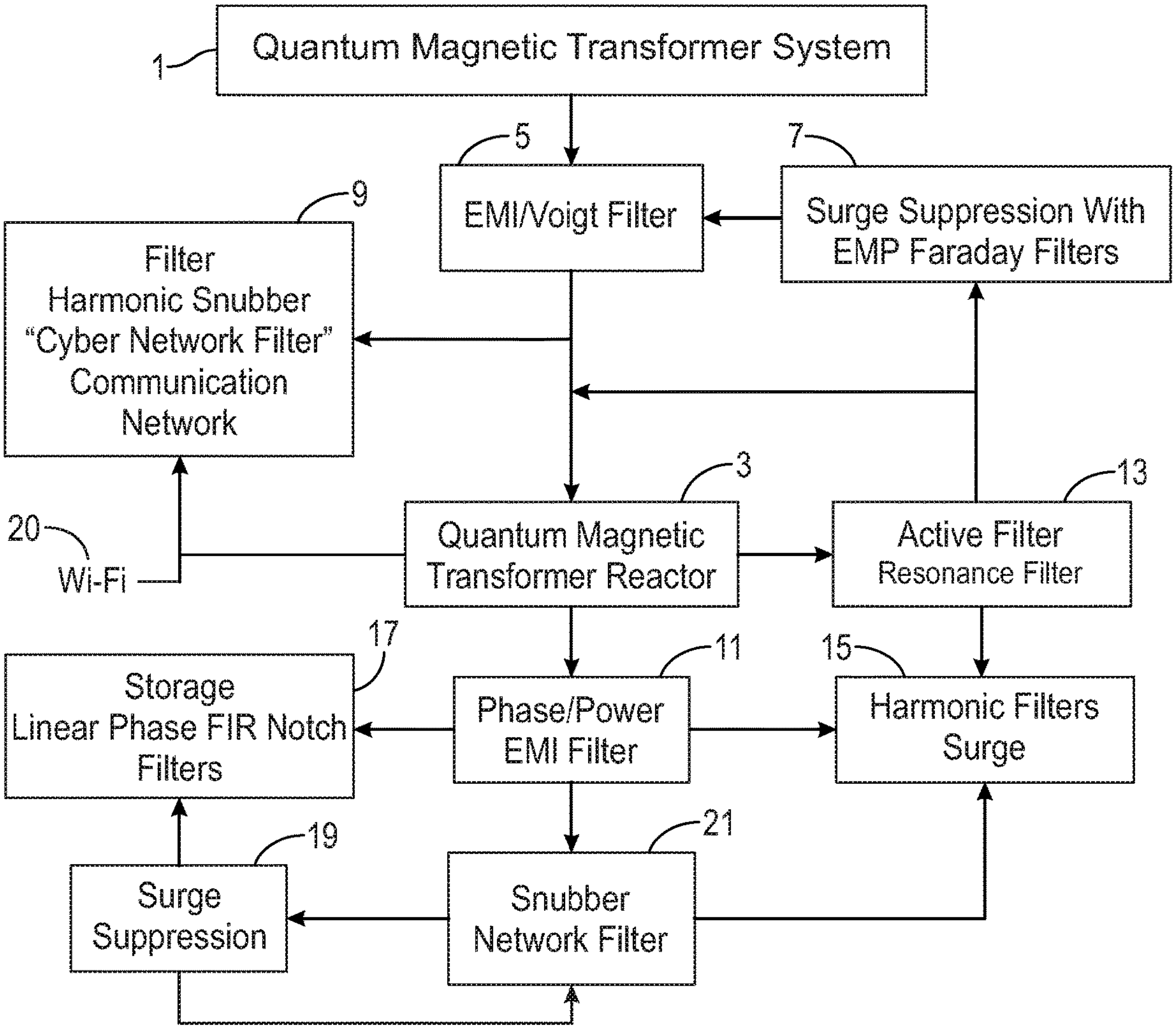
FIG. 1 illustrates a block diagram of a present invention energy saver device that includes a high efficiency magnetic transformer as its core feature.

The present invention high efficiency magnetic transformer reactors replace earlier iterative transformers and are faster and more efficient than those transformers and, in many applications, will be more accurate, sometimes by an order of magnitude. The present invention reactors are utilized in many forms of energy saving devices that are specifically positioned between the grid or other power supply, and the electric consuming component Thus, these present invention reactors have uses in energy saving devices in, for example, any portable electric appliance as well as 0n fixed structures such as in residential, commercial, industrial and institutional settings.

In one preferred embodiment, the present invention high efficiency magnetic transformer reactor is used in a system that is in line with AC incoming voltage to an electrical load site, such as an industrial, commercial, educational or recreational facility. A typical electrical supply arrangement includes an electrical feed line from the service provider connected to all of the electrical devices in a particular location, as in the case of circuit breakers for the main source or for fuel cells or generators for large motors. In another preferred embodiment, the present invention high efficiency magnetic transformer reactors are used in lower amperage energy saving devices for typically light retail (small stores) and residential environments, typically also in line with incoming AC voltage to the electrical load site. As mentioned, these devices with the present invention reactors may also be installed at specific electric consuming equipment, devices and systems, and may also be installed into moveable plug-in devices and other portable devices, such as power equipment and portable and fixed power generators.

Thus, in some implementations, these high efficiency magnetic transformer reactor-containing energy saving systems may be attached at the main source for such things as large motors and motor driven systems. In this manner, they reduce the harmonics in a building; lowering the total harmonic distortion (ThD) to a very low value and adjusting any low Power Factor so as to be adjusted upwardly to 0.95 or greater. A Transient Voltage Surge Suppressor (TVSS) may also be included with a feature to reduce the spikes that can be portable, mobile, or hard wired, for the protection of the location.

In conjunction with the foregoing, the present invention reactors, devices and methods are used in single phase AC, two phase AC, three phase AC and in DC service. can reduce the demand for power by controlling the noise factor and regulating electrical surges and sags in a building, thereby lowering the energy consumption. These systems incorporating the present invention high efficiency magnetic transformer reactors also have the ability to work with large generators and with fuel cell systems for preventing a loss of voltage and current in a given situation and maintaining power requirements needed for short periods of time. In the generator, the system not only reduces kilowatt usage being drawn but also reduces its need for fuel consumption. In the fuel cell, the system is able to suppress the surge/sag, which results in more efficiency for the fuel cell to produce more energy.

In one implementation, a parallel AC power system helps provide a balanced AC load to the potential electrical feed to the building or power supplied by the utility company by means of an electrical enclosure with its electrical parts. It is installed parallel to the main load and/or to the motors drawing the most power. It acts as a voltage and current absorber and corrects a poor power factor. It also improves the THD (Total Harmonic Distortion).

When this present invention high efficiency magnetic transformer reactor in an energy saving system is connected in parallel to the source, it decreases the phase angle of current and voltage. If voltage or current are out of phase it adjusts to proper phase. This system reduces power consumption and responds to the load by means of its current draw and adjusts to the demand by lowering its storage mechanisms. It adjusts the voltage to its current demands by giving the device a supply of voltage, which results in lower demand on usage of its power consumption.

Principles of the present application are also particularly applicable to industrial settings with high current demands (e.g., with loads drawing up to 5,000 Amps). It should be recognized, however, that principles of the present invention are applicable to other electrical load settings, from the largest industrial and commercial applications to small residential and ancillary building electrifications.

FIG. 1 illustrates a block diagram of a present invention energy saver device 1 that includes a high efficiency magnetic transformer 3 as its core feature. This system (device connected to a power consumption input) also includes an EMI Voigt Filter 5, a surge suppressor with EMP faraday filters 7, and a filter/harmonic snubber that is a cyber network filter 9 having a communication network to outside control, data sources, as by, for example, WIFI 20. There is also a phase/power EMI filter 11 and a resonance filter 13, and harmonic surge filters 15, storage linear phase FIR notch filters 17, surge suppressor 19, and a snubber network filter 21. These are specifically aet to operate efficiently with the core reactor 3.

Figure 2:
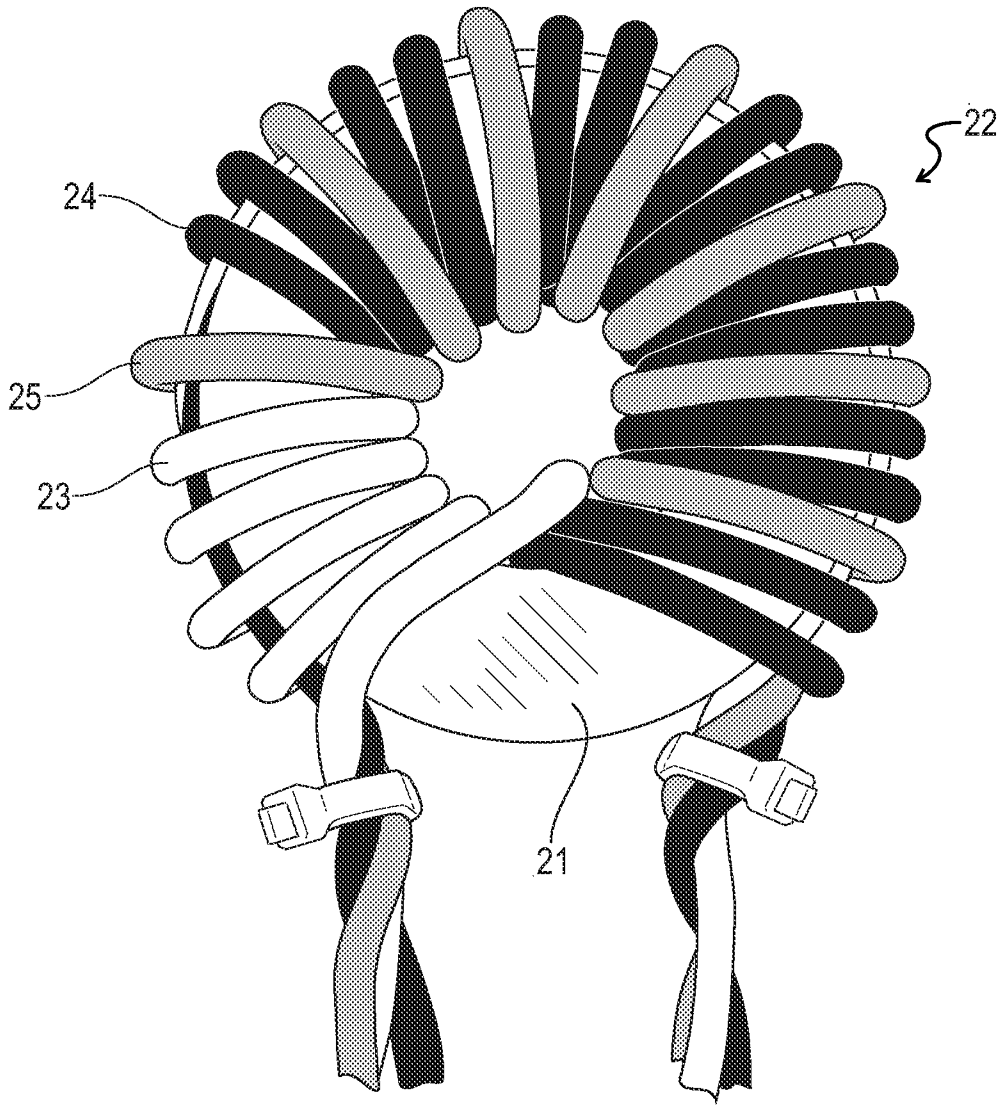
FIG. 2 illustrates a pictorial presentation of one embodiment showing the unique windings of a present invention transformer.

FIG. 2 illustrates a pictorial presentation of one embodiment of reactor, such as present invention high efficiency magnetic transformer showing the unique windings of a present invention transformer 22. There is a coil core 21 having a central orifice, and coil 21 may be selected from the group consisting of a non-magnetic core and a magnetic core. There is a first wire having an incoming end and an outgoing end and being wrapped in a first plurality of winding's around at least 50% of the core through the central orifice. As seen in FIG. 2, in this case, the first wire so wound is wire 24, the black wire. There is a second wire, wire 23, the white wire. This white wire 23 has an incoming end and an outgoing end and is wrapped in a second plurality of winding's around at least 10% of the core through the central orifice in an area separate and away from the first plurality of windings (black wire 24), wherein one end of this second wire is positioned under and through the first plurality of windings (note the left white wire 23 going under wire 24 (position 10 o'clock) and travelling clockwise under wire 24 at right angles thereto it and exiting at about 5 o'clock on the lower right. There is a third wire 25, being the red wire having an incoming end and an outgoing end and being wrapped in a third plurality of winding's around at least 10% of the core through the central orifice, these windings being wound in a manner selected from the group consisting of (i) around the core only; (ii) around the core and around a portion of at least one of the first wire and the second wire; (iii) around the core and around a portion of both of the first wire and the second wire. In this Figure, wire 25, the red wire, is wrapped around the first wire 24. For best practices arrangement, these windings are evenly spaced, as shown in the Figure. In addition, at least one of the first wire, the second wire and the third wire have different conductive chemical contents from the others of the first wire, the second wire and the third wire. Thus, in this FIG. 2 embodiment, one wire includes a conductive metal, e.g., copper, and one other has a different conductive metal, e.g., silver or aluminum. Further, wires 23, 24 and 25 are of different gauges, such as 10 gauge and 8 gauge.

When connected to the other components such as those described in FIG. 1, encapsulation is preferred. When more than one device set, such as doubling or tripling all of the components for two phase and three phase, separators are employed. These separators may be doped.

When the separators are doped, they may be doped with any workable doping agent and these are well known in the circuit board doping industry. In preferred embodiments, the dope is selected from the group consisting of gallium nitride, gallium arsenide, boron nitride, boron arsenide, graphite, graphene and carbon. In some embodiments, the separator components are dielectric film separator components. Separators may be thin plastic film, paper, paper/film composite, wax paper, or other known insulative and dielectric separators. In some cases, coatings of transformer varnish may be used. Many of the transformer varnishes are polyester resin-based. These treatments and the addition of doping agents may be achieved by vapor deposition, spray, coating, dipping, film application (heat weld, glue, etc.). The dope may be applied directly or in solution.

In some cases, graphene may be applied to the separators or to the cores e.g., aluminum or other metal toroids. Graphene is a "miracle" coating known as a nano coating, sometimes only one or two or three atoms of carbon thick. It is commercially available, but rare and expensive. As recently described by the United States Department of Energy (Aug. 30, 2017, USDOE News Release) titled "Controlling Traffic On the Electron Highway: Researching Graphene", graphene creates a very powerful magnetic field that accelerates the movement of electrons. Thus, in the context of the present invention, the flow of electrons may be more rapid with separators that utilize graphene, speeding up the corrective effects of the present invention reactor by rearranging the flow faster to reduce harmonics and other deficiencies and irregularities.

Insulative end caps or encapsulation may be used to isolate and protect the present invention reactor from external physical and electrical interference. This is done after windings are completed, such as those described herein. In some preferred embodiments, the windings are or include a plurality of windings wrapped around a stacked group of hollow centered continuous loop components to pass through the hollow center thereof, said windings including at least two hot wires and at least one ground wire. The encapsulation may be accomplished with epoxy resin dipping or coating, or with fiberglass coatings or other known encapsulation coatings and seals. One technique involves assembling the present invention reactors in metal or other "boxes" with the other components of an energy management device (energy saving device) and pouring epoxy into the box to simultaneously encapsulate the entire contents. Alternatively, a present invention reactor may be coated or encapsulated before assembling with its other components.

FIGS. 3, 4, 5 and 6 have some (many) identical feature components and thus to reduce duplicity, all the individual components shown in these Figures will be set forth below in a single list, wherein like numbers and letter numbers that are identical have identical characteristics/values set out below in the next paragraph.

Figure 3:
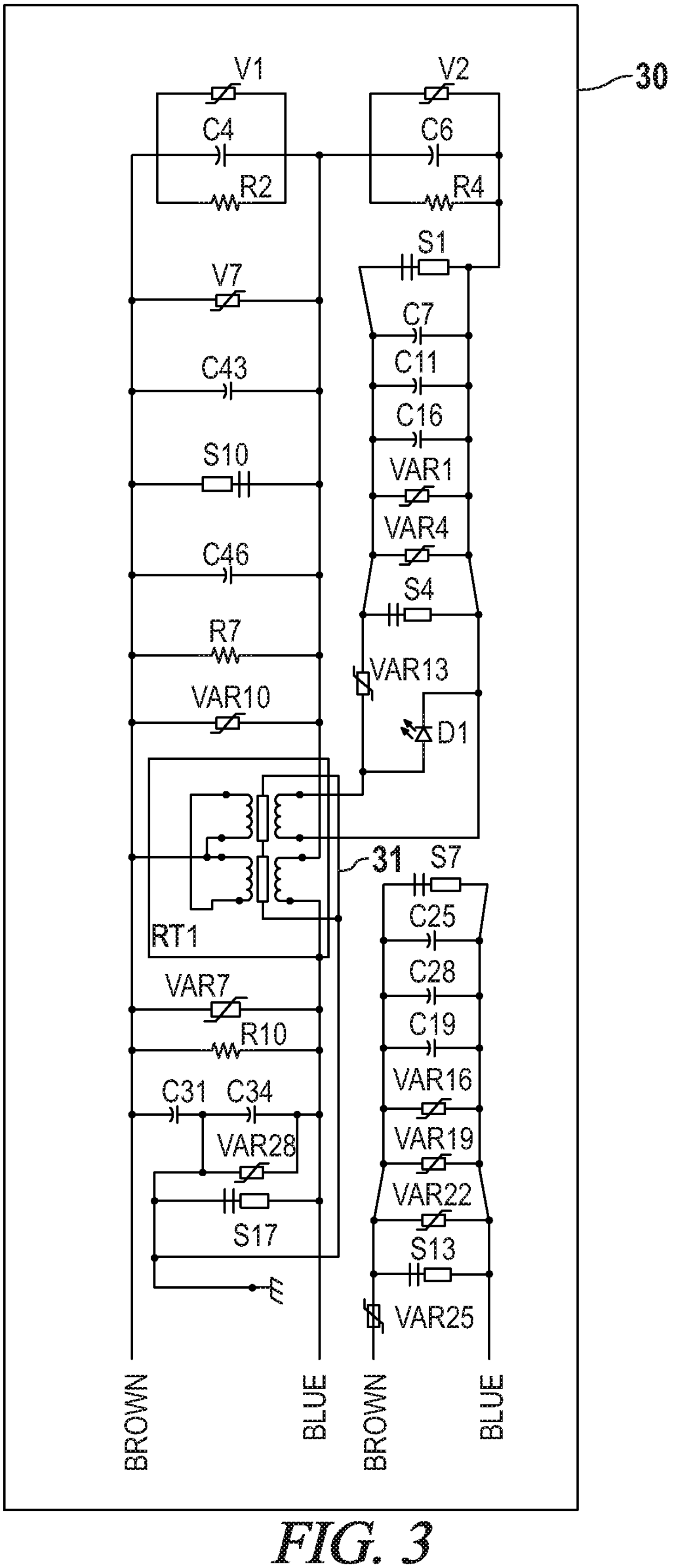
FIG. 3 illustrates a schematic diagram illustrating features of some energy saving devices with preferred embodiment present invention high efficiency magnetic reactor for single phase alternating current electrical distribution.

FIG. 3 illustrates a schematic diagram as frame 30, illustrating features of some energy saving devices with preferred embodiment present invention high efficiency magnetic reactor for single phase alternating current electrical distribution. It has one reactor RT1 also shown by lead line 31, enclosed in a box frame, which is an essential component of this single module.

Figure 4:
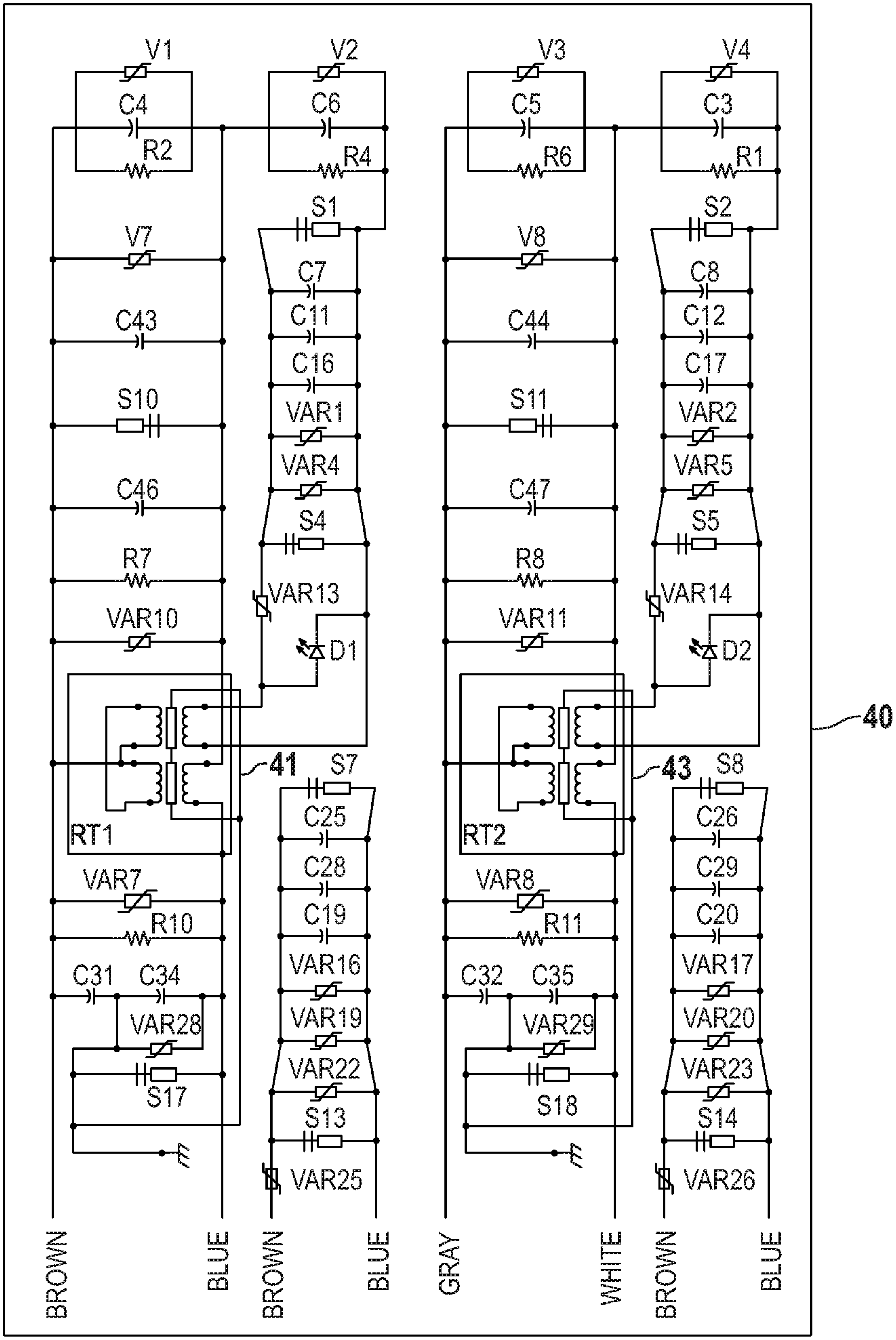
FIG. 4 shows a schematic diagram illustrating features of some energy saving devices with preferred embodiment present invention high efficiency magnetic reactor for two phase alternating current electrical distribution.

FIG. 4 shows a schematic diagram, frame 40, illustrating features of some energy saving devices with preferred embodiment present invention high efficiency magnetic transformer reactor for two phase alternating current electrical distribution, and shows component reactors RT1 and RT2. These are connected in parallel for two phase AC connections with positive and negative connector sets brown and blue, and gray and white, as shown. As can be seen, this is a double arrangement of what is shown in FIG. 3 single phase, and for this two phase AC embodiment, the two modules 41 and 43 are connected in parallel.

Figure 5A:
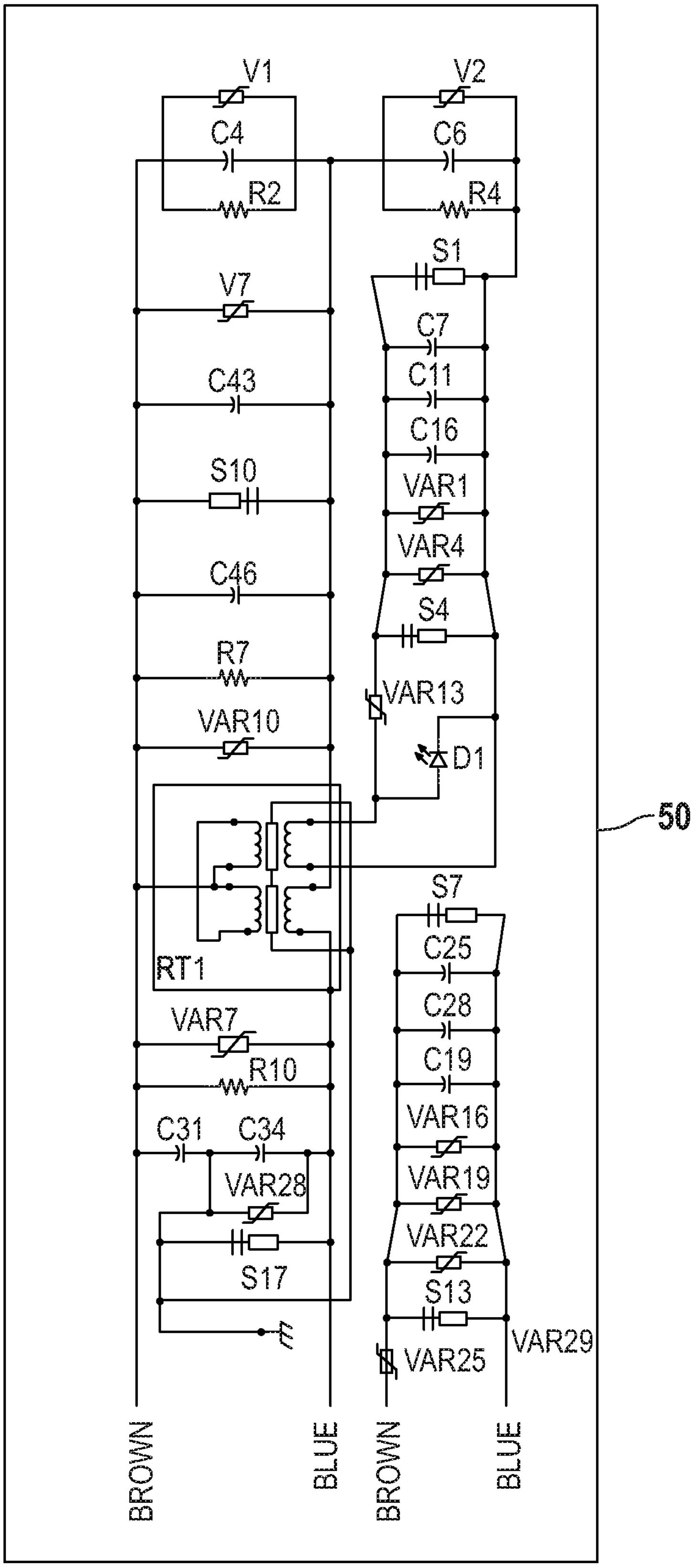
FIGS. 5A, 5B and 5C collectively show a schematic diagram illustrating features of some energy saving devices with preferred embodiment present invention high efficiency magnetic reactor for three phase alternating current electrical distribution.
Figure 5B:
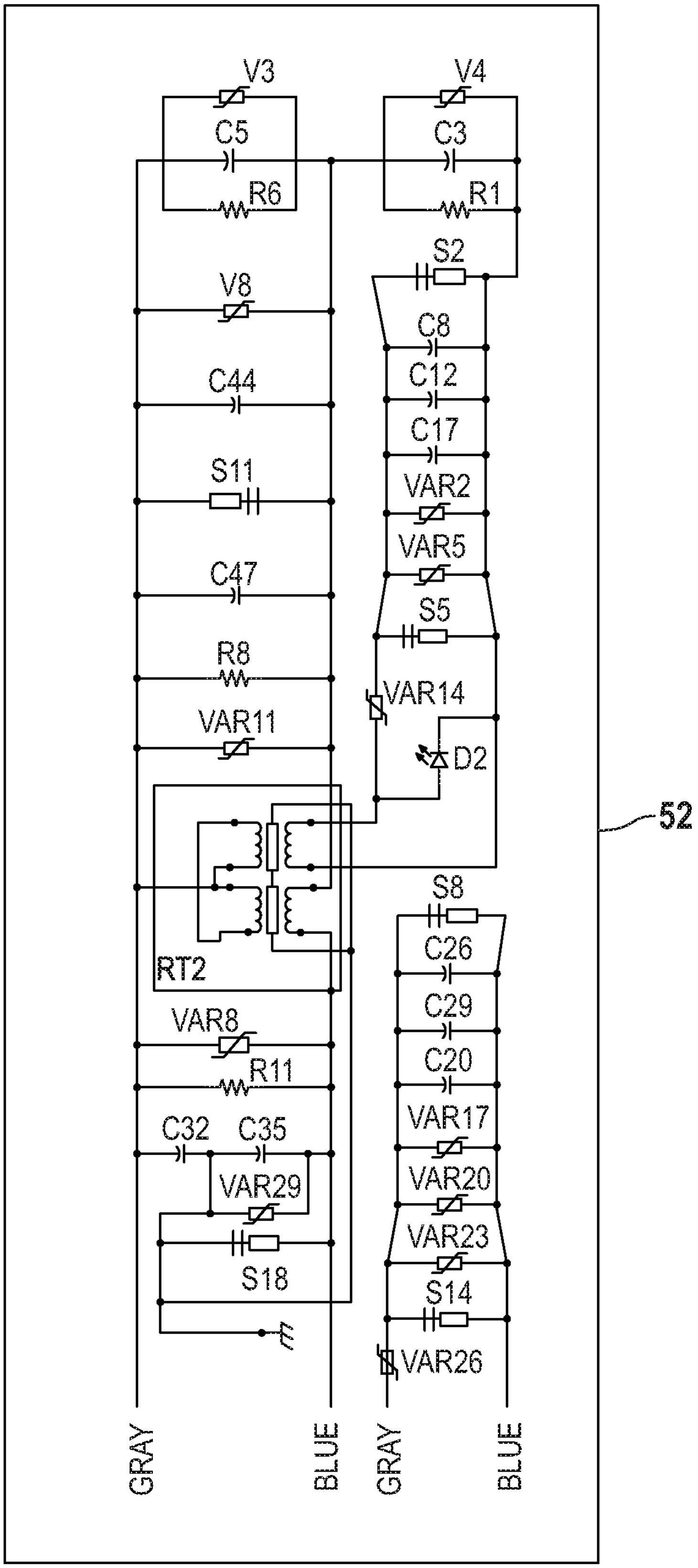
Figure 5C:
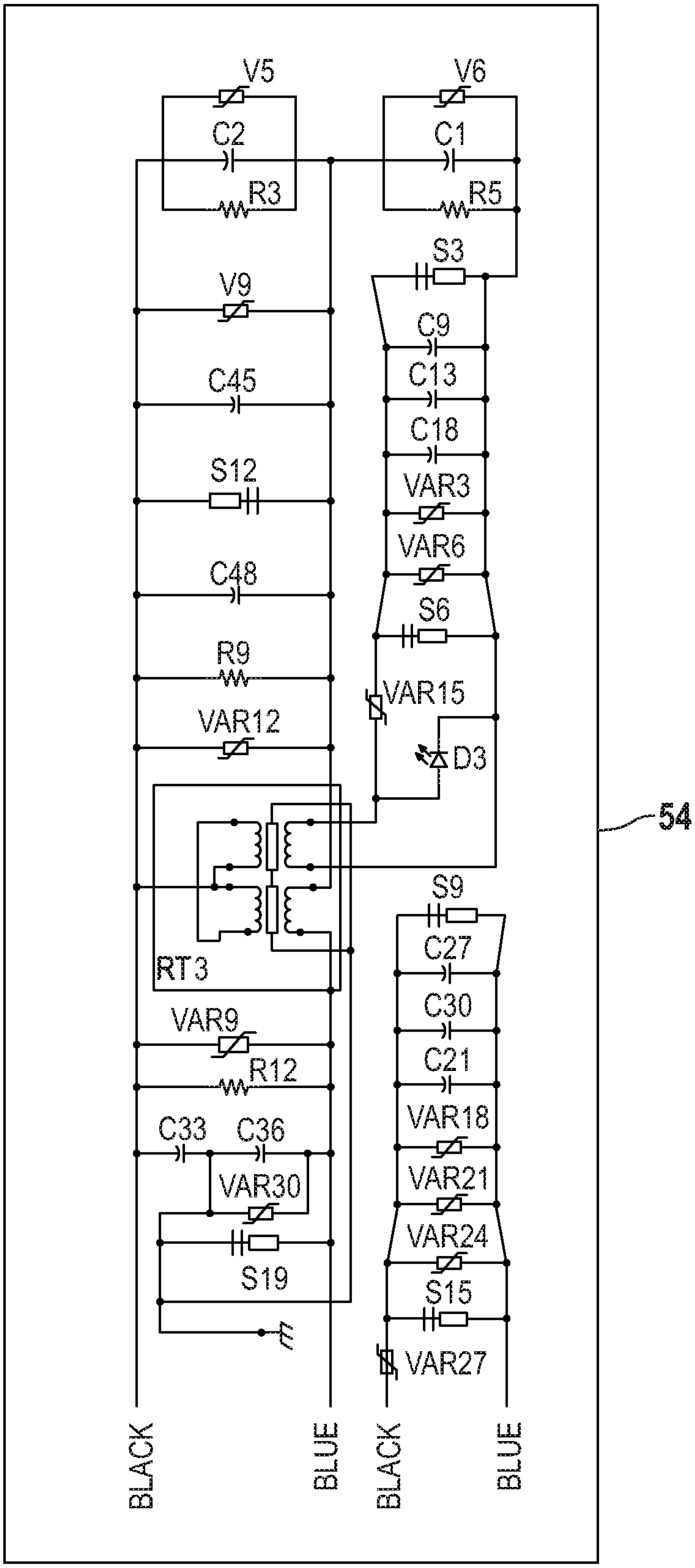

FIGS. 5A. 5B and 5C collectively show a schematic diagram with modules 50, 52 and 54, respectively, illustrating features of some energy saving devices with preferred embodiment present invention high efficiency magnetic reactor for three phase alternating current electrical distribution. There are three sets of positive/negative connectors for parallel connection.

Figure 6:
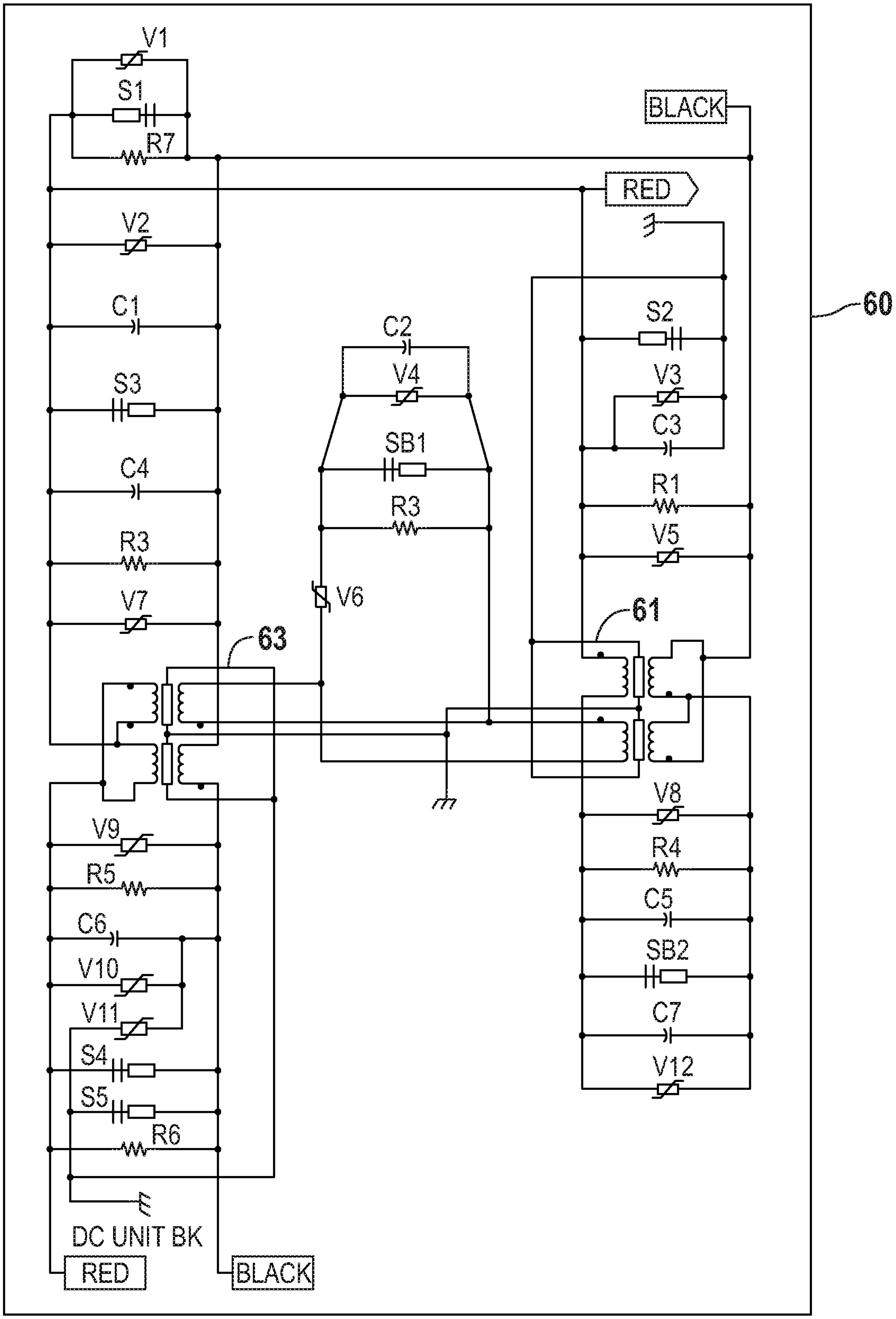
FIG. 6 shows a schematic diagram illustrating features of some energy saving devices with preferred embodiment present invention high efficiency magnetic reactor for direct current electrical distribution.

FIG. 6 shows a schematic diagram illustrating features of some energy saving devices, frame 60 with preferred embodiment present invention high efficiency magnetic reactors 61 and 63, and with in-series connectors 64 and 65, as shown, for direct current electrical distribution.

The following is a list of all components in FIGS. 3, 4, 5A, 5B, 5C and 6, component types and values on the left and corresponding alpha-numeric designations from the Figures.

Capacitors 460 VAC 16 uF C43, C44, C45, C,46, C47, C48

Capacitors 450 VAC 2.5 uF C31, C32, C33

Capacitors 450 VAC 60 uF C1, C2, C3, C4, C5, C6

Board Capacitors 0.01 UF C7, C8, C9, C25, C26, C27

Board Capacitors 2.2 UF C16, C17, C18, C19, C20, C21

Board Capacitors 0.1 UF C11, C12, C13, C28, C29, C30, C34, C35, C36

Bleeder Resistor, 220 k Ohm, 3 W R1, R2, R3, R4, R5, R6, R7, R8, R9, R10, R11, R12

Small snubber 600V S1, S2, S3, S4, S5, S6, S7, S8, S9, S13, S14, S15, S16, S17, S18

Large snubber 660V S10, S11, S12

Metal Oxide Varistor (MOV) 1.1 kV 7.5 kA V1, V2, V3, V4, V5, V6, V7, V8, V9, VAR 1, VAR 2, VAR 3, VAR 4, VAR 5, VAR 6, VAR 10, VAR 11, VAR 12, VAR 13, VAR 14, VAR 15, VAR 16, VAR 17, VAR 18, VAR 19, VAR 20, VAR 21, VAR 22, VAR 23, VAR 24, VAR 25, VAR 26, VAR 27, VAR, VAR 28, VAR 29, VAR 30

MOV 1100V AC 6500A Metal Oxide Varistor S20K1000 Epcos VAR 7, VAR 8, VAR 9

LED 220V-230V D1, D2, D3

These values above are exemplary and lie within mid-range of acceptable, workable ranges. Broadly, the unit values are plus or minus 60% and preferably 30%. Therefore, as an example, 7.5 kA may be substituted with a same device of 10 kA.

Figure 7:
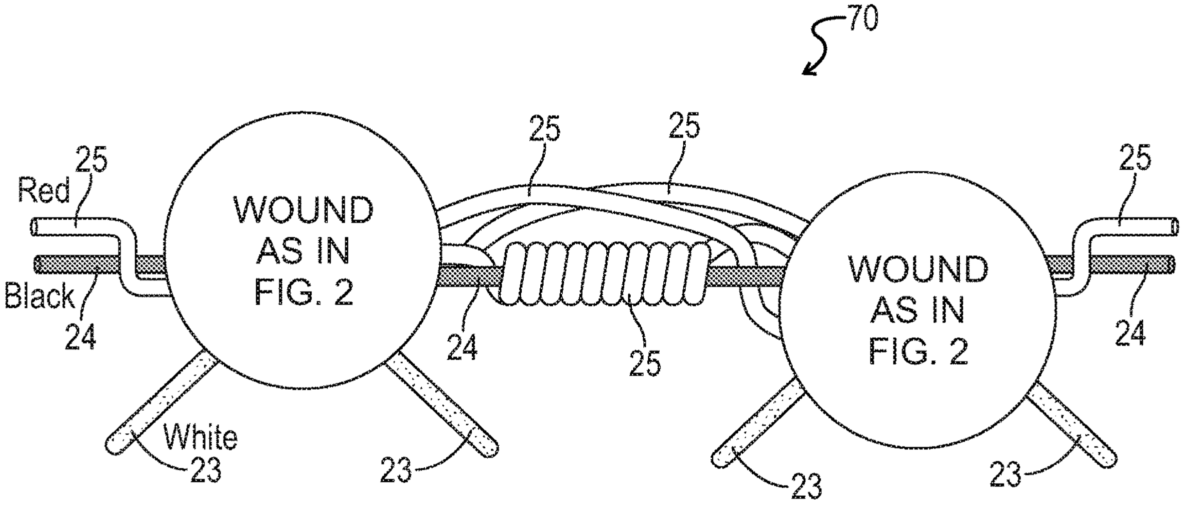
FIG. 7 shows a front view of one embodiment of the present invention AC two phase present invention reactors, using two FIG. 2 reactors and their connection to one another.

FIG. 7 shows a front view of one embodiment of the present invention two phase AC present invention reactors, sub-system 70, using two FIG. 2 reactors and their connection to one another. The wires and windings are from FIG. 2 and are identically numbered.

Figure 8:
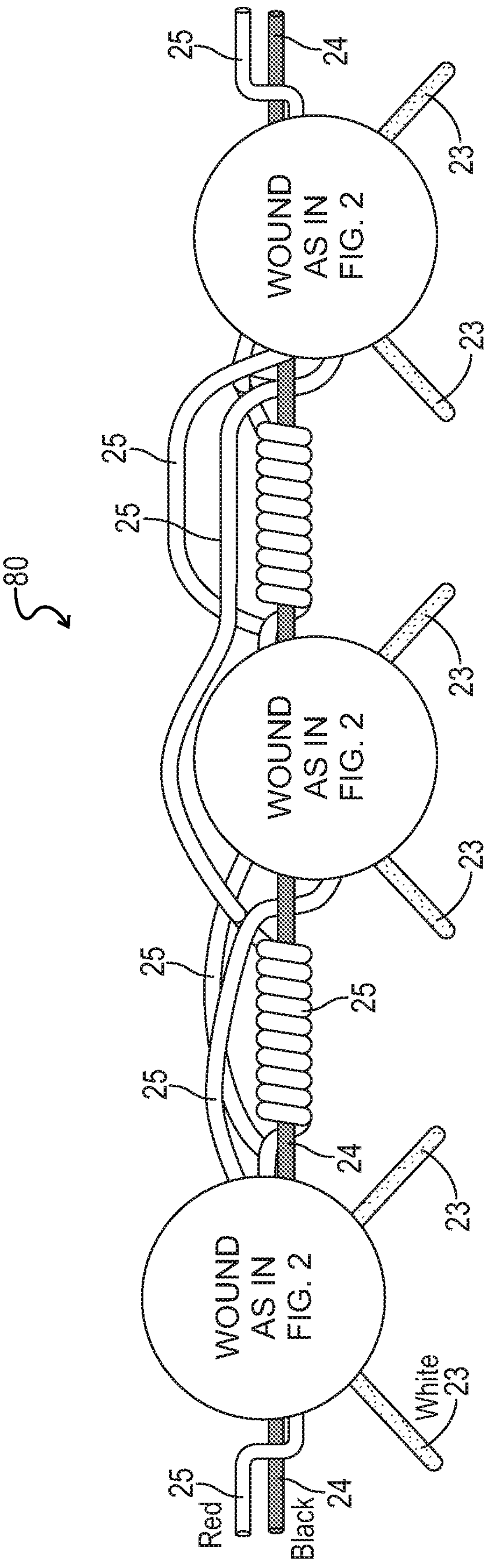
FIG. 8 shows a front view of one embodiment of the present invention AC three phase reactors, using three FIG. 2 reactors (transformers) and their connection to one another.

FIG. 8 shows a front view of one embodiment of the present invention three phase AC reactor's sub-system 80, using three FIG. 2 reactors (transformers) and their connection to one another, again with identically numbered wires.

Figure 9:
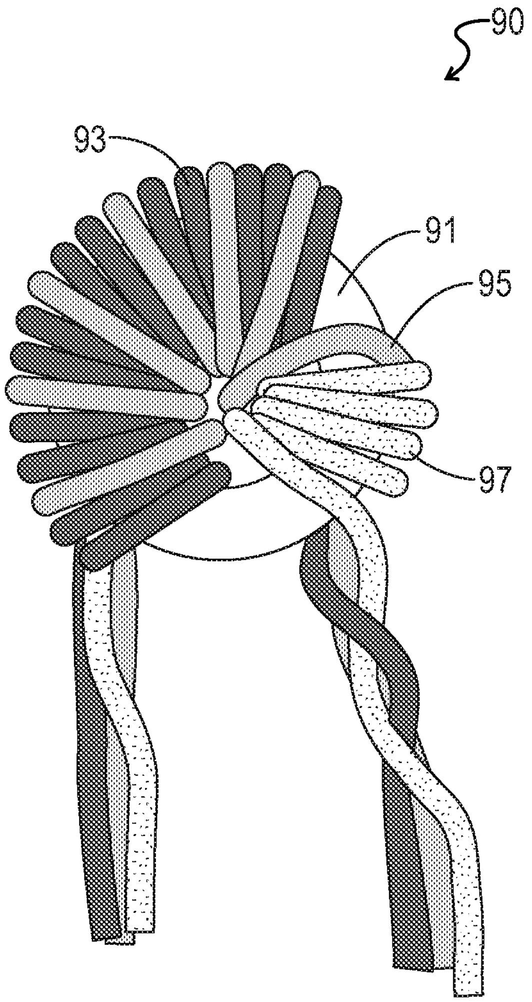
FIG. 9 shows a front view of another embodiment of the present invention reactor that is used for higher amperage instillations.

FIG. 9 shows a front view of another embodiment of the present invention reactor that is used for higher amperage installations. High efficiency magnetic transformer 90 includes a toroidal core 91, and three wires 93, 95 and 97 wound pursuant to the teachings above.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A method for reducing electrical consumption that comprises:

A) installing a device in an electric circuit so as to activate said device, wherein said device includes the following components:

a) an electromagnetic induction Voigt filter, dry type;

b) a harmonics Snubber/Cyber network filter;

c) linear phase FIR notch filters;

d) a surge suppression device;

e) a separate surge suppression device with EMP Faraday filters;

f) an active atomic resonance filter;

g) a harmonic surge filter; and, h) a high efficiency magnetic transformer which includes at least a first coil core having a central orifice, said first coil core being selected from the group consisting of a non-magnetic core and a magnetic core and three different wires attached to said core;

B) wrapping a first wire having an incoming end and an outgoing end in a first plurality of windings around at least 45% of said core through said central orifice;

C) wrapping a second wire having an incoming end and an outgoing end in a second plurality of windings around at least 10% of said core through said central orifice in an area separate from said first plurality of windings, extending one end of said second wire and positioning said one end of said second wire under and through said first plurality of windings, and extending one end of said first wire and positioning said one end of said first wire under and through said second plurality of windings; and, D) wrapping a third wire having an incoming end and an outgoing end in a third plurality of windings around at least 10% of said core through said central orifice, said windings of said third wire being wound around the core and around and atop a portion of at least one of said first wire and said second wire.

2. The method for reducing electrical consumption of claim 1 wherein said third wire is wound around the core and around and atop a portion of said first wire.

3. The method for reducing electrical consumption of claim 2 wherein said third wire is wound around the core and around and atop a portion of said first wire in an evenly spaced manner.

4. The method for reducing electrical consumption of claim 2 wherein said third wire is wound around the core and around and atop a portion of said first wire in a ratio of one third wire winding for each first wire winding.

5. The method for reducing electrical consumption of claim 1 wherein at least one of said first wire, said second wire and said third wire have different conductive chemical contents from the others of said first wire, said second wire and said third wire, and wherein said different conductive chemical contents is selected from the group consisting of: a difference in percentage of conductive constituents, and a difference in conductive metal elements.

6. The method of claim 1 wherein at least one of said first wire, said second wire and said third wire includes copper and at least one other of said first wire, said second wire and said third wire does not contain copper.

7. The method of claim 1 wherein at least one of said first wire, said second wire and said third wire includes silver and at least one other of said first wire, said second wire and said third wire does not contain silver.

8. The method of claim 1 wherein at least one of said first wire, said second wire and said third wire includes aluminum and at least one other of said first wire, said second wire and third wire does not contain aluminum.

9. The method of claim 1 wherein at least one of said first wire, said second wire and said third wire has a different gauge thickness than at least one other of said first wire, said second wire and said third wire.

10. The method of claim 1 wherein said device includes a plurality of said high efficiency magnetic transformers.

11. The method of claim 10 wherein said plurality of transformers are separated by a graphene divider.

12. The method of claim 11 wherein said surge suppression device with EMP Faraday filters is a ground system less than 5 Ohms with a high protection rating and a copper metal shield enclosure, wherein said graphene divider forms a magnetic plate and is connected to said copper shielding and said ground system.

13. The method of claim 1 wherein said surge suppression device with EMP Faraday filters is a ground system less than 5 Ohms with a high protection rating and a copper metal shield enclosure, wherein said graphene divider forms a magnetic plate and is connected to said copper shielding and said ground system.

14. The method of claim 1 wherein said harmonic snubber/cyber network filter is set to suppress or clamp preselected wave frequencies of voltage transients.

15. The method of claim 1 wherein the harmonic scrubber/Cyber network filter is a voltage having transients within the voltage to suppress or clamp any preset frequencies tuned for an AC wave.

* * * * *